Patented June 15, 1943

2,321,787

UNITED STATES PATENT OFFICE 2,321,787

SULPHUR DYESTUFFS

Werner Zerweck, Frankfort-on-the-Main-Fechenheim, and Wilhelm Hechtenberg, Frankfort-on-the-Main, Germany, assignors to General Aniline & Film Corporation, New York, N. Y., a corporation of Delaware No Drawing. Application July 22, 1941, Serial No. 403,574. In Germany July 22, 1940

6 Claims. (Cl. 260—128)

Our present invention relates to sulphur dyestuffs, more particularly to those obtained by acting with a sulphurizing agent on an anthracene derivative, in the molecule of which the anthracene nucleus is condensed with at least one and at most two nitrogen containing rings, which rings on the other side are connected with arylradicles containing at least one and at most two benzene nuclei.

The initial products for the present process of sulphurization correspond to one of the following schemes of formulae:

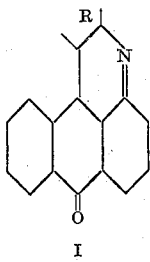

I and

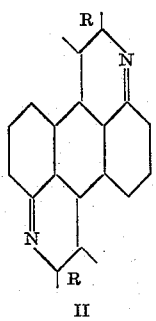

II wherein R stand for an arylradicle, containing at least one and at most two benzene nuclei.

The products corresponding to scheme I generally are named as coeramidonine compounds, those corresponding to scheme II as dicoeramidonine or dibenzodiazaperylene compounds; both types are obtainable according to the process of British specification No. 7,398 of 1901.

The process of sulphurization may be carried out by one of the usual methods such as by treatment with sulphur and/or sulphur dichloride or a polysulphide solution in the presence or absence of a copper compound and isolating the reaction product in the usual manner.

The present dyestuffs dye the vegetable fibers mostly brownish to olive to grayish shades of valuable fastness properties.

In order to further illustrate our invention the following examples are given, the parts being by weight and all temperatures in degrees centigrade.

Example 1

To a polysulphide mixture of 70 parts of crystallized sodium sulphide and 40 parts of sulphur 20 parts of coeramidonine of the formula

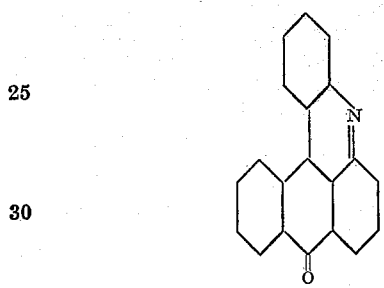

are added at boiling temperature. The mixture is boiled at about 118° for some hours under reflux, then the mass is evaporated, subsequently the residue is heated to about 270° and held for about 8 hours at 270 to 280°. The raw product is dissolved in a mixture of sodium sulphide and a caustic soda solution and the sulphur dyestuff thus formed is isolated by acidifying the aqueous solution. It is when dry a black powder and dyes the vegetable fibers from the sodium sulphide bath olive-brown shades.

Example 2

When starting for the process as described in Example 1 from the equivalent amount of 14-methylcoeramidonine of the formula:

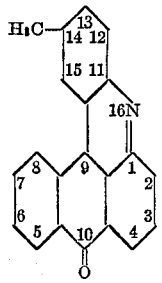

and adding 5 parts of copper sulphate to the residue obtained after evaporisation the formed dyestuff dyes the vegetable fibers brownish olive shades.

Example 3

To a mixture of 12 parts of sulphur and 150 parts of sulphur dichloride there are added slowly at 70 to 80° 40 parts of 14-(4'-aminophenyl)-coeramidonine of the formula:

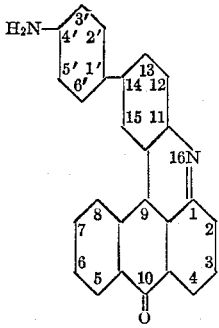

The mixture is slowly heated to about 150°, then boiled for about 1 hour under reflux and then the mass is distilled until dryness. The residue is thereafter heated to about 270° and held at this temperature for about 6 hours. After treatment with a mixture of sodium sulphide and a caustic soda solution the dyestuff is isolated as described above. It is when dry a black powder and dyes the vegetable fibers from the sodium sulphide bath dark brown shades.

By adding copper sulphate a dyestuff is obtained which dyes somewhat more bright shades.

The aforesaid 14-(4'-aminophenyl)-coeramidonine is obtainable according to British specification 7,398 of 1901. It is soluble in concentrated sulphuric acid with a bright green color and melts, when recrystallized from chlorobenzene, at 280°.

When starting from 14.15-benzocoeramidonine of the formula:

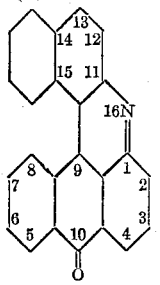

(cf. German Patent 272,614) the formed dyestuff dyes the vegetable fibers olive-brown shades whereas the dyestuff obtained while starting from 12.13-benzocoeramidonine of the formula:

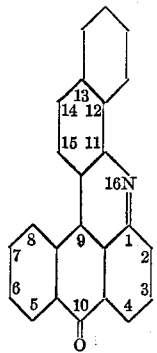

(cf. German Patent 246,337) dyes brownish olive shades.

Example 4

When starting for the process as described in Example 1 from 20 parts of nitrocoeramidonine, obtainable by nitrating coeramidonine in the presence of concentrated sulphuric acid with a slight excess over the theoretical amount of nitric acid, the formed dyestuff is when dry a dark gray powder and dyes the vegetable fibers greenish gray shades, whereas the dyestuff derived from nitro-14.15-benzocoeramidonine obtainable by nitrating likewise 14.15-benzocoeramidonine dyes olive-brown shades.

Example 5

To a mixture of 15 parts of sulphur in about 150 parts of sulphur dichloride there are slowly added at 70 to 80° 50 parts of 5.6.11.12-dibenzo-4.10-diazaperylene (dicoeramidonine) of the formula:

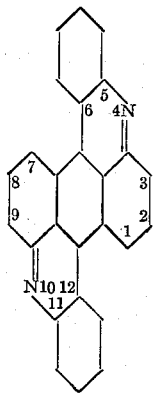

obtainable for instance according to British specification No. 7,398 of 1901. The mixture is slowly heated to about 150°, then boiled for about one hour in an apparatus provided with a reflux condenser and evaporated to dryness. The residue is then heated for about 6 hours at about 270° and then dissolved in the usual manner in a mixture of sodium sulphide and a caustic soda solution. The formed dyestuff is isolated therefrom by acidification or blowing in air. It is when dry a blackish gray powder and dyes the vegetable fibers from the sodium sulphide bath olive shades of good fastness.

When adding to the aforesaid residue, obtained after the evaporation to dryness, 8 parts of copper sulphate, heating the mixture for about 6 hours at about 300° and dissolving the reaction mass in a sodium sulphide and caustic soda solution the isolated dyestuff is when dry an olive-brown powder and dyes the vegetable fibers from the sodium sulphide bath olive shades.

Example 6

When starting from the dimethylated derivative of 5.6.11.12-dibenzo-4.10-diazaperylene of the formula:

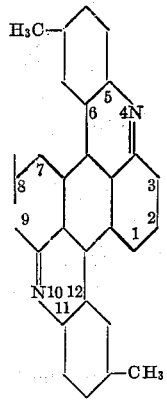

obtainable for instance by starting from 1.5-di-para-toluido-anthraquinone according to British specification No. 7,398 of 1901 and carrying out the sulphurisation the formed dyestuff dyes the vegetable fibers from the sodium sulphide bath fast olive shades.

Example 7

To a polysulphide mixture of 56 parts of crystallized sodium sulphide and 32 parts of sulphur there are added at boiling temperatures, 20 parts of dinitro-5.6.11.12-dibenzo-4.10-diazaperylene obtainable for instance by nitrating 5.6.11.12-dibenzo-4.10-diazaperylene with a small excess over the theoretical amount of nitric acid in the presence of sulphuric acid. The mixture is boiled for some hours at about 118° in an apparatus provided with a reflux condenser and then evaporated to dryness. The residue is heated at 280 to 300° for about 4 hours. The raw product thus obtained is dissolved in a mixture of sodium sulphide and a caustic soda solution and the formed dyestuff is isolated as described above. It is when dry a gray powder and dyes the vegetable fibers from the sodium sulphide bath brownish olive shades.

Example 8

A mixture of 50 parts of dinaphtho-4.10-diazaperylene of the formula:

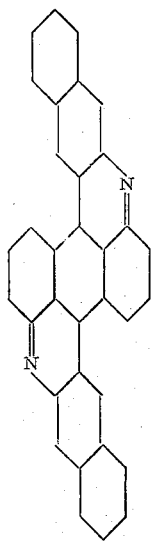

prepared by the action of phosphoric acid in the heat on 1.5-di-2'-naphthylaminoanthraquinone and 200 parts of sulphur is slowly heated to about 270° and the mixture is held for some hours at this temperature. After having been dissolved in a mixture of sodium sulphide and a caustic soda solution the formed dyestuff is isolated as a blackish powder which dyes the vegetable fibers olive shades.

We claim:

1. Sulphur dyestuffs obtained by acting with a sulphurizing agent on an anthracene derivative, in the molecule of which the anthracene nucleus is condensed with at least one and at most two nitrogen containing rings, which rings on the other side are connected with arylradicles containing at least one and at most two benzene nuclei, which dyestuffs dye the vegetable fibers brownish to olive to grayish shades of valuable fastness properties.

2. Sulphur dyestuffs obtained by acting with a sulphurizing agent on an anthracene derivative corresponding with the formula:

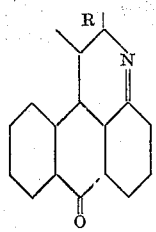

wherein R stands for an arylradicle, containing at least one and at most two benzene nuclei, which dyestuffs dye the vegetable fibers brownish to olive to grayish shades of valuable fastness properties.

3. Sulphur dyestuffs obtained by acting with a sulphurizing agent on an anthracene derivative corresponding with the formula:

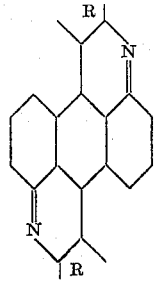

wherein R stands for an arylradicle, containing at least one and at most two benzene nuclei, which dyestuffs dye the vegetable fibers brownish to olive to grayish shades of valuable fastness properties.

4. The sulphur dyestuff obtained by acting with a sulphurizing agent comprising a mixture of sodium sulphide and sulphur on an anthracene derivative corresponding with the formula

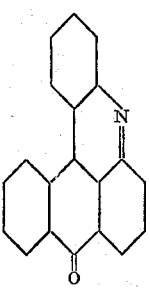

which dyestuff dyes vegetable fibers olive brown shades.

5. The sulphur dyestuff obtained by acting with a sulphurizing agent which comprises a mixture of sulphur and sulphur dichloride on an anthracene derivative corresponding with the formula

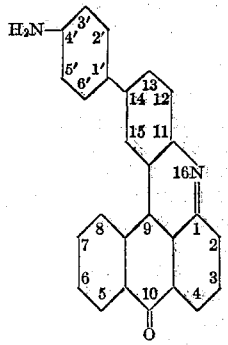

which dyestuff dyes vegetable fibers dark brown shades.

6. The sulphur dyestuff obtained by acting with a sulphurizing agent comprising a mixture of sulphur and sulphur dichloride on an anthracene derivative corresponding with the formula

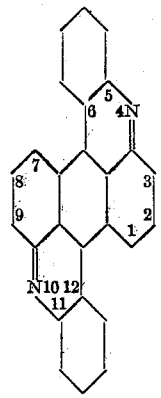

which dyestuff dyes vegetable fibers olive shades.

WERNER ZERWECK.
WILHELM HECHTENBERG.